United States Patent [19]

Chiarulli et al.

[11] Patent Number: 4,748,585
[45] Date of Patent: May 31, 1988

[54] PROCESSOR UTILIZING RECONFIGURABLE PROCESS SEGMENTS TO ACCOMODATE DATA WORD LENGTH

[76] Inventors: Donald M. Chiarulli, 4724 Newcomb Dr., Baton Rouge, La. 70808; W. G. Rudd, Dept. of Computer Science Oregon State University, Corvallis, Oreg. 97331; Duncan A. Buell, 1212 Chippenham Dr., Baton Rouge, La. 70808

[21] Appl. No.: 817,814

[22] Filed: Dec. 26, 1985

[51] Int. Cl.⁴ ............................................. G06F 9/00
[52] U.S. Cl. ................................................... 364/900
[58] Field of Search ............................ 364/900, 200

[56] References Cited

U.S. PATENT DOCUMENTS

| | | | |
|---|---|---|---|
| 4,136,383 | 1/1979 | Takesue | 364/200 |
| 4,199,811 | 4/1980 | Borgerson et al. | 364/200 |
| 4,344,134 | 8/1982 | Barnes | 364/200 |
| 4,384,324 | 5/1983 | Kim et al. | 364/200 |
| 4,438,494 | 3/1984 | Budde et al. | 364/200 |
| 4,498,134 | 2/1985 | Hansen et al. | 364/200 |

*Primary Examiner*—Gareth D. Shaw
*Assistant Examiner*—John G. Mills, III
*Attorney, Agent, or Firm*—William David Kiesel; Robert C. Tucker; Timothy J. Monahan

[57] ABSTRACT

An independently programmable, parallel processor for electronic computers for performing mathematical and logical operations is provided having an array of arithmetic-logic units which are interconnected so as to form dynamically reconfigurable segments of arithmetic-logic units within the array. These dynamically reconfigurable segments are formed by particular combinations of the arithmetic-logic units and are so combined with selective switching circuitry so as to provide the processor with its independent and parallel features.

6 Claims, 4 Drawing Sheets

PROCESSOR UTILIZING RECONFIGURABLE PROCESS SEGMENTS TO ACCOMODATE DATA WORD LENGTH

BACKGROUND OF THE INVENTION

1. Field of the Invention

This invention relates in general to central processing units (CPU) of electronic computers and more particularly to processors.

2. Description of the Prior Art

Existing central processing units are not capable of spreading a large number of different problems over a large number of processors. Major efforts over the last five years to solve this problem have concentrated on cost of components and simplified design. These current central processing units (CPU) contain either a uni-processor or multi-processors. The uni-processor consists of a single arithmetic-logic unit (ALU) using two random access memories (RAM), one being used as a memory, the second being used for multiple registers. Also contained within the uni-processor are micro-instructions which control a microsequencer. By contrast, the multi-processor contains all of these components except there are a number of duplications of the system; i.e. a multi-processor is like a chain of interconnected uni-processors. In the past, larger and larger mathematical problems have been computed by using more multi-processors constructed from higher speed components built from a variety of materials. The problem with building larger multi-processors is that the multi-processor still operates as a group of uni-processors since each processor is still independently programmed with a single instruction and single data stream. The result is that each processor works independently from other processors from the standpoint of both the programming and the control. More explicitly, no processor has any input regarding what and how the other processors are performing within the total multi-processor. Consequently, existing processors are based on asynchronous concurrent processing. While processors in the prior art have been successful, they are basically designed for general purpose applications. The major drawback of multi-processors for computing has been the difficulty in developing effective parallel algorithms to program these systems and effectively exploit their highly specialized capabilities.

SUMMARY OF THE INVENTION

Figure 1:
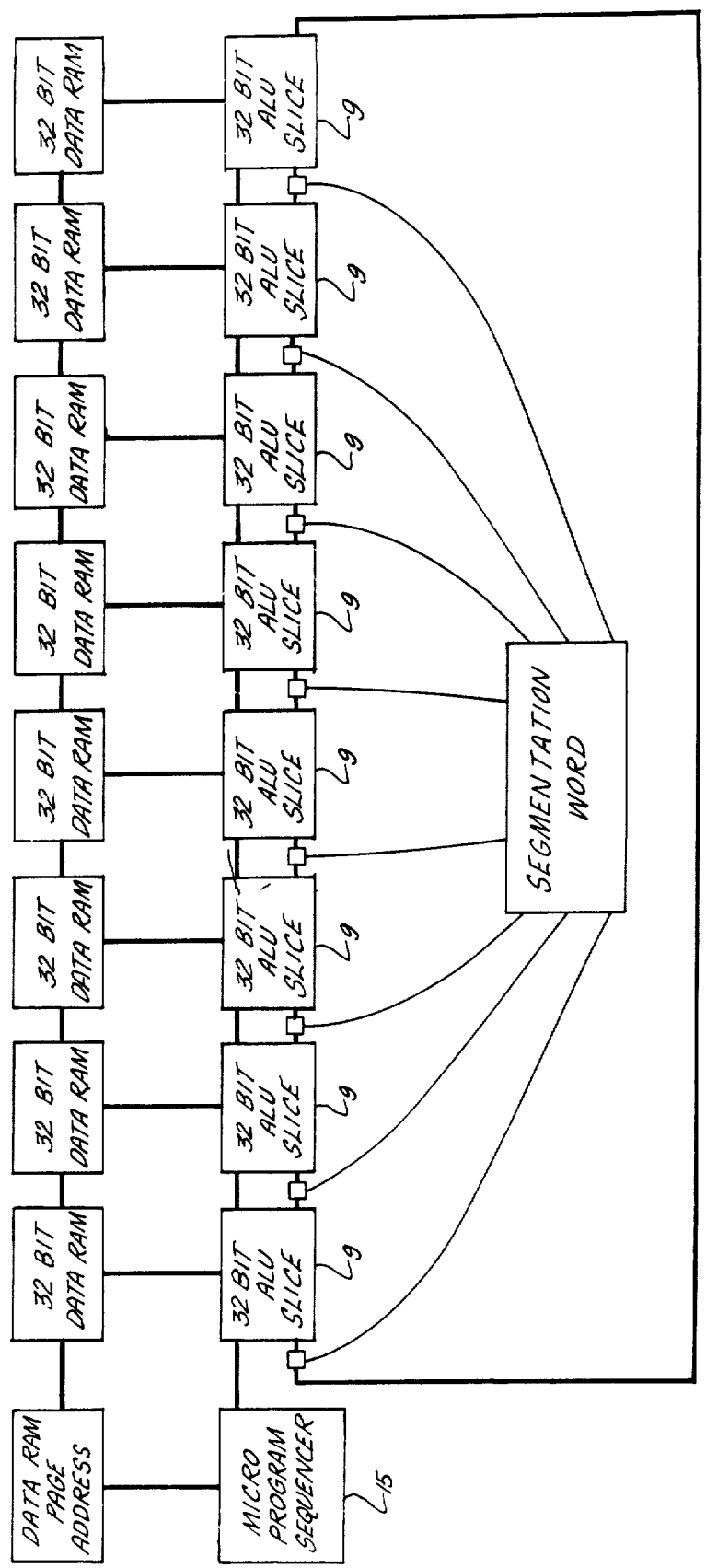
FIG. 1 is a schematic view of the hybrid processor.

Therefore, it is an object of this invention to use off-the-shelf components to produce a Segmentation Control Section which only uses one sequence controller for an entire array of ALU slices.

It is another object of this invention to allow the individual ALU slices to be combined together as segments during any calculations so as to form dynamically reconfigurable, independent programmable segments with which parallel computations may be performed.

It is a further object of this invention to provide a concurrent programmable processor which will have the characteristics of speed and parallelism of a multi-processor while retaining the programmable ease of a uni-processor.

It is still another object of this invention, while under program control, to alter its effective word lengths to suit the sizes of current operands. Since each ALU slice has its own operation code, the machine can execute several different instruction sequences simultaneously on different sets of operands of different lengths, yielding a highly parallel machine with all the ALU slices under the control of a single sequence controller with a single clock. Additionally, all ALUs use the same instruction store address in executing a instruction word with the result being that the machine does not suffer from the problems in controlling and coordinating asynchronous processors that arise in true multi-processor architectures.

Accordingly, an independently programmable, parallel processor for electronic computers for performing mathematical and logical operations is provided having an array of arithmetic-logic units which are interconnected so as to form dynamically reconfigurable segments of arithmetic-logic units within the array. These dynamically reconfigurable segments are formed by particular combinations of the arithmetic-logic units and are so combined with selective switching circuitry so as to provide the processor with its independent and parallel features.

PREFERRED EMBODIMENTS OF THE INVENTION

The computer architecture which is the subject of this invention is a departure from the traditional asynchronous, independent multi-processor approach and falls in a classification as a hybrid between conventional multi-processors and uni-processors.

This invention solves a wide variety of computing problems because of its unique, simple structure, by allowing easier and more efficient programming than may be accomplished with traditional, parallel multi-processors while retaining many of their speed advantages.

These features are particularly apparent in applications requiring large integer arithmetic where a processor needs to operate as both a long word length uni-processor and to be reconfigurable to a parallel processor.

This invention is sufficiently general to permit its application to almost every kind of computing problem. However, the original motivation for the invention was to design a special computer for experiments in particularly large numbers. The mathematics necessary in factoring very large numbers involves very repetitious but also very long mathematical algorithms which results in lengthy time requirements for processing. Lengthy calculations not only add to cost, but also make certain applications of factoring impractical as well. For example, in the field of cryptography, factoring is used for both encryption and decryption and therefore needs to be performed very rapidly. Current processors do not have this capability.

Additionally, current uni-processors and multi-processors do not work well with rational arithmetic. For example, a fraction such as one-half is carried in the micro-processor as point five. This invention will allow calculations to be made on algorithms involving rational arithmetic at greatly reduced time requirements.

This invention will reduce cost and complexity of processor components and it will be easier to build and program because of single instruction addresses. Again, this invention is essentially a hybrid between the uni-processor and the multi-processor.

Figure 2:
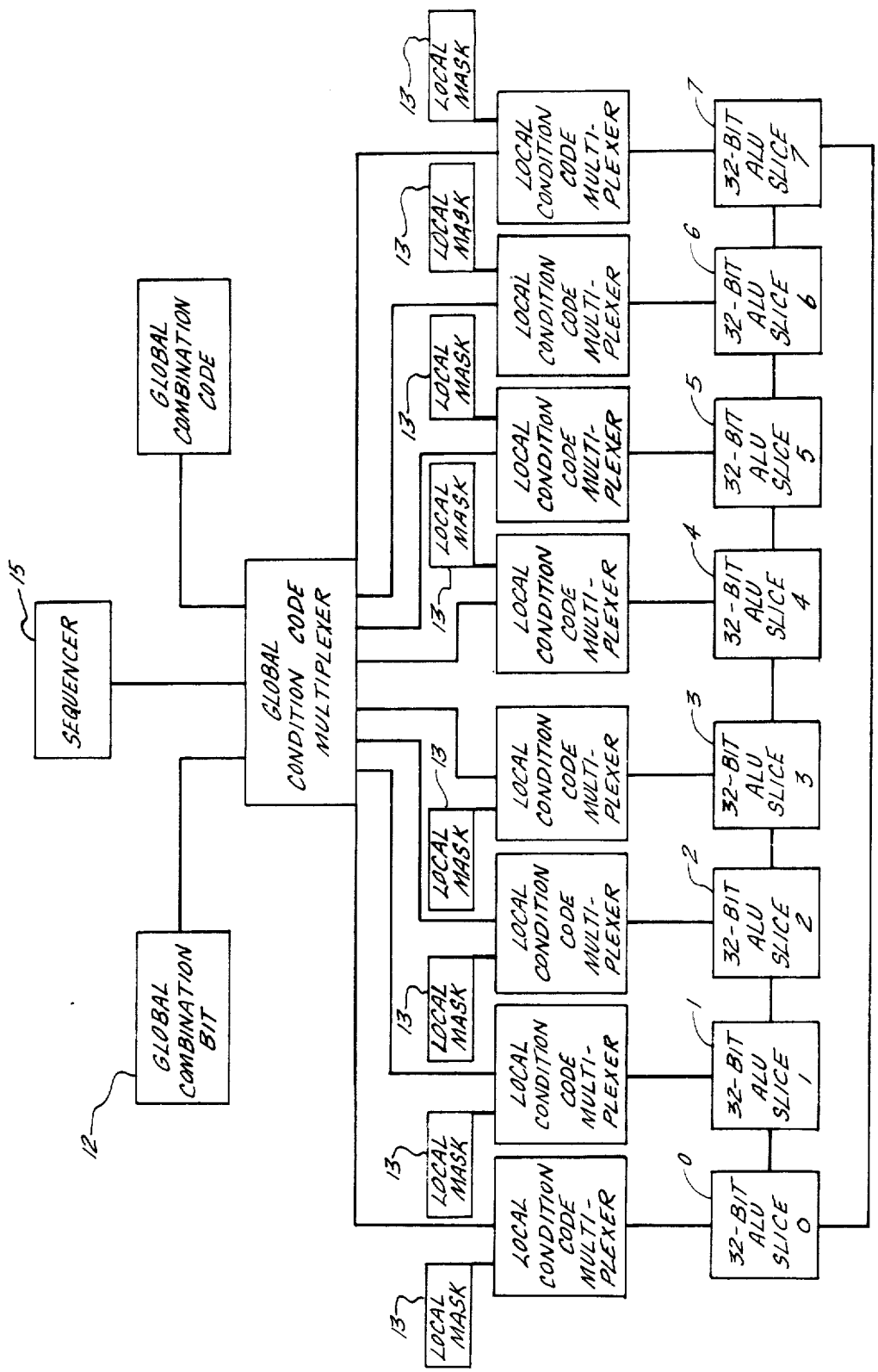
FIG. 2 is a schematic view of the hybrid processor.
Figure 3:
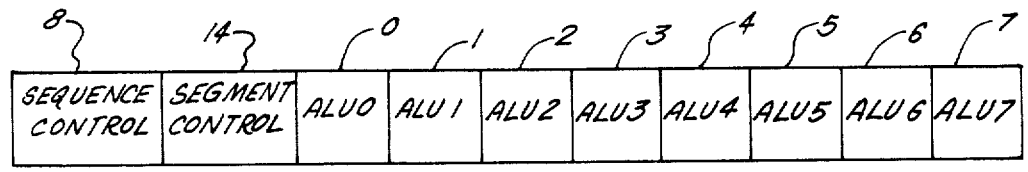
FIG. 3 is a schematic view of the instruction word.
Figure 4:
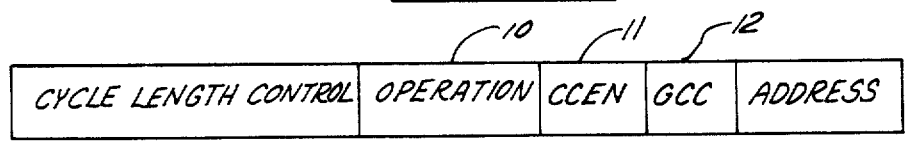
FIG. 4 is a schematic view of the Sequence Operation Code Section.
Figure 5:
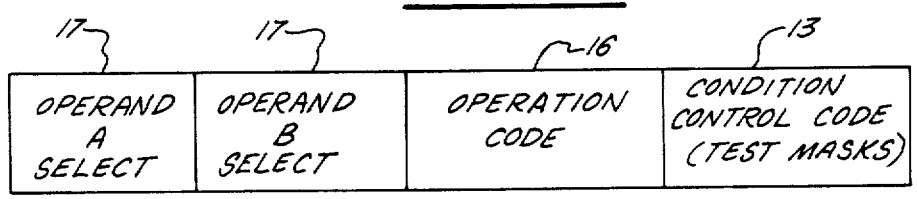
FIG. 5 is a schematic view of the ALU control section.
Figure 6:
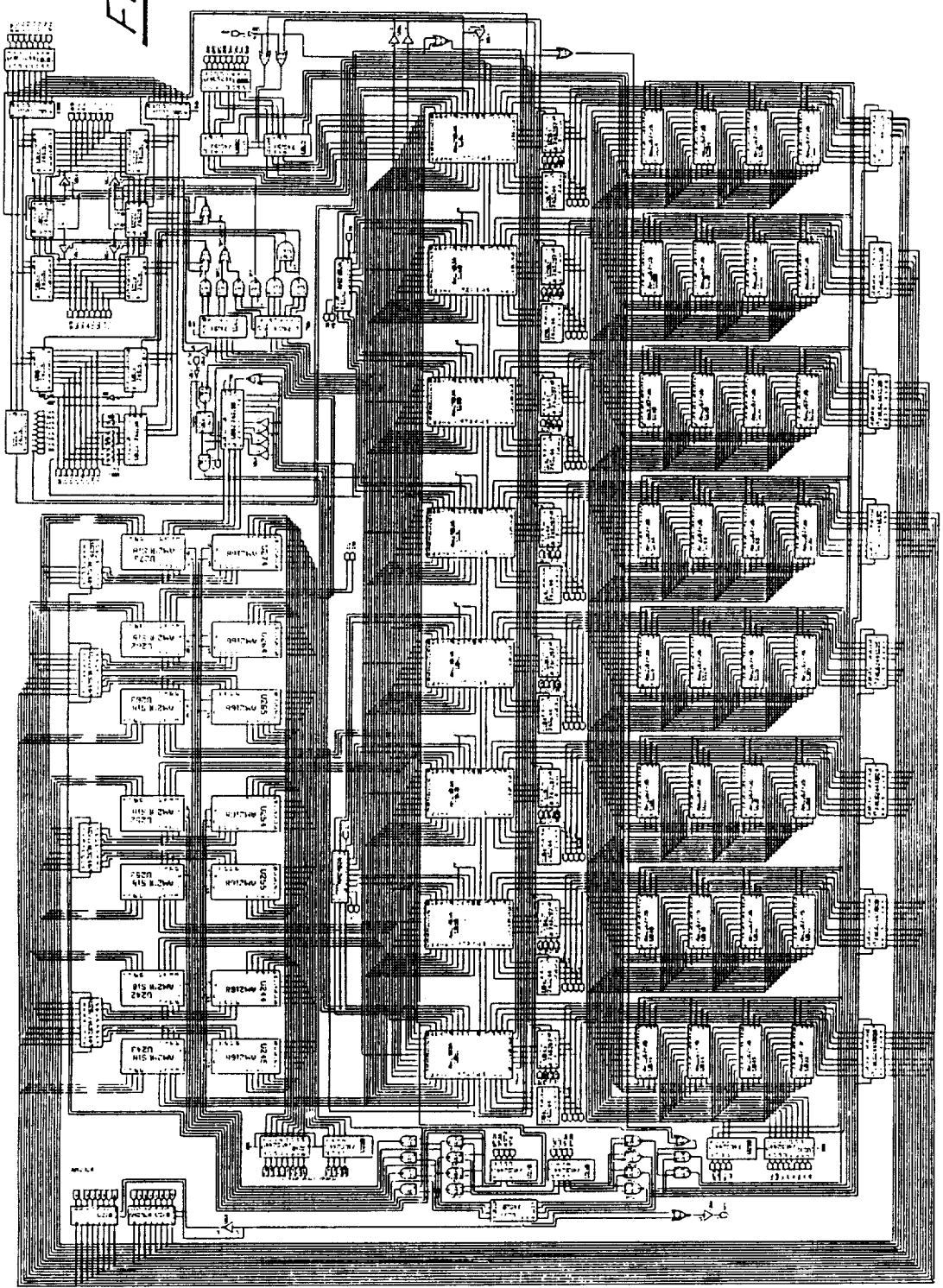
FIG. 6 is a schematic view of an ALU slice.

A preferred embodiment of the invention shown in FIG. 1 contains a 256-bit ALU, which is constructed from eight 32-bit ALU slices 9. A schematic diagram of an individual ALU slice is shown in FIG. 6. Each of these ALU-slices 9 may be combined with or isolated from its neighboring slice at the micro-instruction level. While an isolated slice or a connected set of neighboring slices is called a segment, this architecture is not restrictive as to how the slices may be combined to form segments. For example, a single 256-bit segment; eight 32-bit segments; two 32-bit segment; a 64-bit segment and a 128-bit segment, or any other intermediate combination may be formed by an appropriate setting of the segmentation control word that is part of the instruction word that may be seen in FIG. 3. The instruction word in FIG. 3 includes a sequence controller section 8, a segmentation control word 14, and an ALU section (0, 1, 2, 3, 4, 5, 6, 7) that contains one control word for each slice. Each ALU slice 9 has its own operation code 16, operands 17, and a set of condition test masks 13 (See FIG. 5); however, the ALU slices 9 are not independent concurrent processors, rather they have a single sequencer 15 and clock controlling the timing of all operations. At the end of each operation, each ALU generates a local status output. Each local status output is operated on by a local test mask to produce a binary status bit. Each segment containing a plurality of ALU's and thus a plurality of binary status bits, can be represented by a single local condition code which is valid for the entire segment. The local condition codes are combined to generate branching instructions as discussed below. In the preferred embodiment, this invention is an attached arithmetic processor for an off-the-shelf mini-computer system. The control and data memories of this invention's hybrid processor are accessible to the host system. Control/status information is also available at input/output ports to allow control over the hybrid processor by the host. Referring to FIG. 2, the micro-programmable sequencer 15 is designed around the AMD2910A micro-program controller. This controller chip will provide sixteen instructions for condition testing and branching, a counter register for loop control, and a nine-level stack for subroutine linkage. The sequencer operation code in FIG. 4 is a six-bit field formed from the four-bit sequencer instruction input 10, a condition-enable bit 11, and a global condition combination bit 12. The condition-enable bit 11 distinguishes between the unconditional and the conditional analogs of the sixteen sequencer operations. The global condition combination bit 12 selects the logical operation (AND/OR) which is used to combine the local condition codes 16 (See FIG. 5) from each segment to generate the single-bit condition code input t the sequencer. A global condition combination bit 12, set to one (AND), means that all the segments must return a logic one for their condition code outputs in order for the global condition to be true. A global condition combination value of zero (OR) yields a global condition true if any of the segments produce a local condition that is true. In combination with the condition-enable bit input, this system generates three analogs for each sequencer operation that tests the external condition input to the sequencer. For example, built into the sequencer is a conditional branch operation. Combining this conditional branch operation code with the condition-enable and combination bits yields three instructions in this invention which are JP for unconditional branching, JP AND for conditional binary based on AND conditional branching, and JP OR for conditional binary based on OR conditional branching.

Traditional sequencers utilize a fixed frequency clock to generate the master clock and consequently, the micro-cycle length. The operation at the longest path for data flow through the system determines this clock frequency by the amount of propagation delay in that path. Since not all operations require the same delay, some improvement in system performance may be achieved by matching the micro-cycle length to the operation being executed. In this invention, the fact that the effective word length varies from instruction to instruction means that the ability to vary the micro-cycle length is important. For example, considering the delay in conventional look-ahead carry circuits, the word length for an operation grows one additional 30–45 ns when added to the propagation delay for each level added to the carry look-ahead tree. For the preferred embodiment, the micro-cycle length field of the instruction controls a clock generator that divides a crystal frequency of 30 mhz into clock wave forms ranging from approximately 90 ns to 300 ns. Referring to FIG. 3, the segmentation control word 14 is an eight-bit field in each instruction word, and controls the gating and consequently the segment configuration during each instruction of the microprogram. Each bit of the segmentation control word 14 controls the gating between the corresponding segment 0 through 7 (0, 1, 2, 3, 4, 5, 6, 7) and its lower order, adjacent neighbor. The gating provides for connection of carry-out from the low-order slice to carry-in of the high order slice. Similarly, the gating connection makes bidirectional shifts possible. This segmentation word is also used by the carry look-ahead circuitry condition code multiplexer and shift linking multiplexer to assure the proper interconnection of control and status information between the segments found.

Many other variations, modifications, and alternate embodiments may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of this invention as defined in the following claims.

I claim:

1. A method of operating an electronic computer processor having a plurality of ALU's which may be operated in combination to increase their effective word length comprising the steps of:
  (a) synchronizing two or more of said ALU's;
  (b) connecting two or more of said ALU's according to a field in a single instruction word, whereby each group of connected ALU's and each isolated ALU define a segment having a data word length equal to the combined word length of each ALU in said segment;

(c) entering a separate operation code and a separate operand instruction for each of said ALU's, said operation codes and said operand instructions being contained in a field in said single instruction word;

(d) generating a local status output for each of said ALU's;

(e) converting each of said local status outputs to a binary status bit;

(f) resolving said binary status bits into a single-bit condition code;

(g) selecting a common, next instruction word address for said ALU's based upon a status of a condition enable code which directs whether said selection is to be made unconditionally or whether said selection is to be made conditioned upon a status of said single-bit condition code.

2. A method according to claim 1 wherein said condition enable code is responsive to a field in said single instruction word.

3. A method according to claim 2 wherein said conversion of said local status bits is accomplished by operation of a local test mask for each ALU, said local test mask being responsive to a field in said single instruction word.

4. A processor according to claim 3, wherein:

(a) said binary status bits for each segment are resolved into a local condition code for each segment;

(b) said local condition codes are resolved into a single-bit condition code by operation of an AND combination or an OR combination in response to a field in said single instruction word.

5. A method according to claim 4 further comprising the step of entering a branching instruction into a sequencer, said branching instruction being contained in a field in said single instruction word, and said sequencer being in communication with said condition enable code and said single-bit condition code.

6. A method according to claim 5, wherein there is a single program for all of said ALU's.

* * * * *